United States Patent Office 3,410,407
Patented Nov. 12, 1968

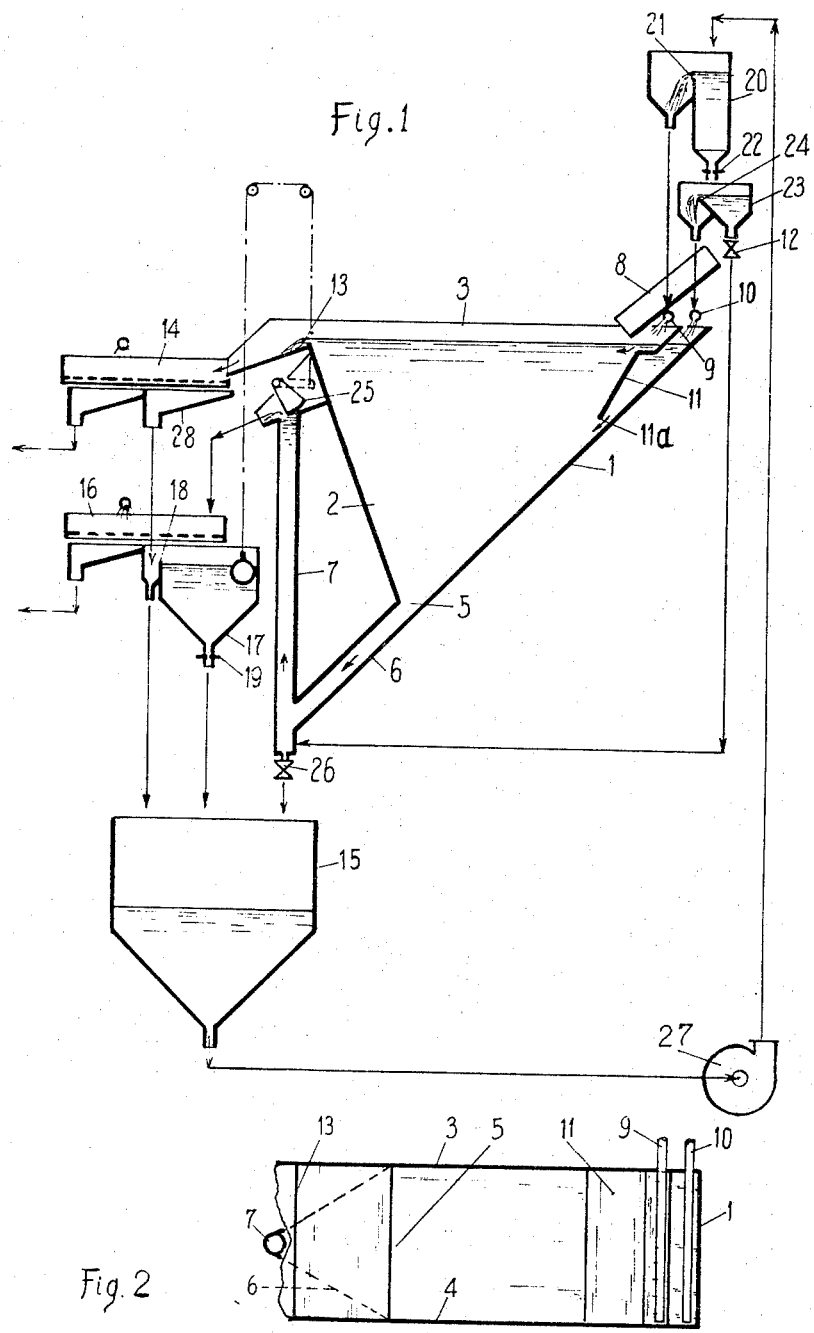

3,410,407
QUIESCENT ZONE HEAVY
MEDIA SEPARATOR
Klaas F. Tromp, 80 Julianalaan,
Bilthoven, Netherlands
Filed Feb. 11, 1966, Ser. No. 526,771
4 Claims. (Cl. 209—172.5)

ABSTRACT OF THE DISCLOSURE

Gravity separation of solid particles having different specific gravities is effected by introducing liquid suspension substantially along and at the liquid level of a body of the liquid suspension and also introducing liquid suspension at a level well below the liquid level. Liquid suspension and entrained lighter solid particles are removed at the liquid level and liquid suspension with entrained heavier particles is removed at a lower level and the liquid suspension introduction flows and liquid suspension removal flows are balanced to effect a quiescent zone between the two levels of liquid suspension introduction.

---

This invention relates to methods and apparatus for separating coal or ore into two products according to their specific gravity by means of a suspension as separating medium and, more particularly, to separating products of small particle size.

It is well known that the separation by dense medium is adversely affected by a high viscosity of the medium in particular when separating small-sized material. On the other hand, if the viscosity of the medium is kept low, the medium solids tend to settle out, with the result that the density of the suspension is not uniform but increases with the depth of the bath. For offsetting this phenomenon it has been proposed to agitate the suspension as by mechanical stirring or by the use of vertical currents. These types of agitation, however, also adversely affect a true gravity separation, particularly when small-sized particles are involved.

According to the present invention the above disadvantages are substantially avoided by creating a horizontal flow near to the liquid level of the bath by supplying suspension at the front end of the separating tank and discharging substantially the same volume per minute of suspension together with the floats at the rear end of the tank, creating a downward flow along the front wall of the tank separate from said horizontal flow by supplying suspension of the same density as that of the first suspension at a level below the liquid level at the front end of the tank and withdrawing substantially the same volume per minute of suspension together with the sinks from the bottom of the tank.

The invention also consists in providing a plant in which to carry out the above described process.

One embodiment of this invention is illustrated diagrammatically in the annexed drawings.

FIG. 1 is an elevation of a plant comprising a washing tank, this washing tank being shown in vertical cross section.

FIG. 2 is a plan view of the washing tank of FIG. 1.

The apparatus illustrated in the drawings FIGS. 1 and 2 comprises a washing tank having a sloping front wall 1, a sloping rear wall 2 and side walls 3 and 4, which in the drawing are vertical but which may also have inclined positions. The side walls 3 and 4, which in the drawing are parallel, may also converge towards the rear wall.

The bottom of the tank is provided with a transverse opening 5 extending through the full width of the bath and into hopper 6, which communicates with pipe 7 for discharging the sinks.

An inclined chute 8 is provided for introducing the material to be treated, such as raw coal, to the tank. Below the chute 8 are two pipes 9 and 10, for supplying liquid suspension to the tank, said pipes being provided with nozzles so as to evenly distribute the liquid suspension through the full width of the tank. The guide plate 11 has a horizontal portion just below the liquid level for directing the incoming liquid suspension toward the discharge overflow side of the tank substantially along the level of the liquid suspension. The liquid suspension from pipe 10, which is introduced behind the guide plate 11 is forced to enter at the level 11a. A third supply of liquid suspension, regulated by valve 12, is introduced at the bottom of pipe 7.

Assuming the tank to be filled with liquid suspension having a specific gravity of 1.5 and raw coal to be supplied thereto, the coal lighter than 1.5 specific gravity will float on the surface of the liquid suspension and be driven by the current of liquid suspension supplied by pipe 9 towards and over the weir 13 and be flushed to screen 14, which allows the liquid suspension to pass therethrough and be returned to the collecting tank 15.

Assisted by the current of liquid suspension from pipe 10, entering at 11a, coal having a specific gravity of greater than 1.5 will be urged to slide along the front wall 1 through hopper 6, be lifted through pipe 7 by the liquid suspension flow as also controlled by valve 12, and be discharged to pass over screen 16, which allows the liquid suspension to pass to a conical tank 17. The tank 17 is provided with an overflow weir 18 and, at the bottom, with a restricted outlet opening, for example an orifice plate 19. The liquid suspension flowing out or over from tank 17 is returned to the collecting tank 15.

From tank 15 the liquid suspension is pumped to a conical tank 20, which is provided with an overflow weir 21 and, at the bottom with a restricted outlet-opening, for example an orifice plate 22. The overflowing liquid suspension is delivered to pipe 9 and the outflowing liquid suspension to box 23, which is provided with an overflow weir 24 and, at the bottom, with the valve 12. The liquid suspension flowing over weir 24 is directed to pipe 10.

It is important to maintain flow conditions properly balanced so that currents are avoided in the liquid suspension which would tend to upset the gravity separation. Thus, the liquid suspension discharged at 13 should ideally just be supplied by the volume of liquid suspension discharged by pipe 9 and of course the remainder of the liquid suspension introduced, by pipe 10 and through valve 12, should be equal to the volume of liquid suspension discharged through pipe 7. If pipe 9 is supplying too little liquid suspension, an upward current flow will be created from point 11a to point 13, and if pipe 10 is supplying too little liquid suspension, a downward current flow will be created over the plate 11 and downwardly to the opening 5, both of which conditions will upset proper gravity separation.

Assuming the vertical distance between the overflow weir 21 and the orifice plate 22 of the conical tank 20 to be same as that between the overflow weir 18 and the orifice plate 19 of the conical tank 17 and the restricted openings in these orifice plates also to be of the same size, the zone above the lower edge 11a of guiding plate 11 can be kept free from upward or downward currents by keeping the level of the liquid suspension in the conical tank 17 at the point of overflowing.

This can be achieved manually by regulating the outflow from pipe 7 by setting the curved plate 25 in the correct position. This regulation can also be made automatically by having the position of the curved plate 25 float-controlled, as diagrammatically shown, or by means of known electronic or other level-control devices.

The plant is operated as follows. The size of the opening in orifice plate 22 (and therefore also in orifice plate 19) is taken such that the volume of liquid suspension flowing out of this opening, and therefore the volume of liquid suspension flowing through pipe 7, produces a rising velocity in pipe 7 sufficiently strong for lifting the largest particles of heavy solids.

It is further necessary that the volume of liquid suspension passing through the transverse opening 5 is sufficiently large for assuring that the density in the bath does not increase with depth. If the suspension as discharged from pipe 7 is higher in density, valve 12 should be throttled. In this way, the rate of withdrawal of bath suspension from the bottom is increased.

The lower edge 11a of guiding plate 11 should be located at such a depth that a quiescent zone is provided within which particles of density very close either way to the density of the liquid suspension may migrate in the proper direction. That is, in the quiescent zone, slightly lighter particles may rise and slightly heavier particles may sink, each ultimately to encounter the proper current for its removal therewith. The critical dimension for this depth is higher for finer particle sizes of the coal and for lower densities of the liquid suspension. A depth of two feet will be sufficient for most cases.

By locating the edge 11a of guiding plate 11 just below the actual separating or quiescent zone, the suspension from 10 assists in flushing the heavier particles to hopper 6, in other words, allows the inclination of front wall 1 to be made considerably less than otherwise would be warranted. This has the advantage that for the same length of travel for the lighter particles and, therefore, for the same accuracy of separation, the height of the separating tank can be reduced. This, in turn, reduces the cost of the plant, in particular by reducing the height of the building.

If the conical tank 20 is placed such that the liquid suspension from 22 would feed pipe 9 and the overflow would be directed to box 23 and if the conical tank 17 would change place with the catch tray 28, the same absence of vertical currents in the upper zone of the bath could be obtained by observing that the level in the conical tank 18 be kept at the point of overflowing.

What I claim is:

1. A system for separating solid materials having different specific gravities, which comprises
    a tank having a top edge over which liquid suspension and entrained lighter solid particles are adapted to be discharged and a bottom opening through which the liquid suspension and heavier solid particles are adapted to be discharged,
    means for introducing solid particles of different specific gravities to the surface of the liquid suspension,
    first means for introducing liquid suspension into said tank remote from said top edge and in substantially horizontal direction toward said top edge,
    second means for introducing liquid suspension into said tank at a level therein below the point of suspension introduction effected by said first means,
    a vertical conduit communicating with said bottom opening in the tank and having an upper end for discharging the liquid suspension and heavier solid particles at a level below said top edge of the tank,
    means for proportioning the volumes of suspension introduced into the tank through said first and second means,
    and control means for regulating the flow of suspension through said conduit to entrain and carry the heavier solid particles and to maintain the volumetric flow of suspension over said top edge and the volumetric flow of said first means substantially equal while the volumetric flow through said vertical conduit and the volumetric flow of said second means are substantially equal whereby a relatively quiescent zone is established between the level of said top edge and the level of suspension introduction by said second means.

2. The system as defined in claim 1 including third means for introducing suspension fluid into the bottom of said vertical conduit.

3. The system as defined in claim 2 including second control means for adjusting the flow rate through said third means.

4. The process for separating solid materials having different specific gravities which comprises:
    introducing solid particles of different specific gravities to the surface of a body of liquid suspension,
    creating a lighter particle-entraining current in the body of liquid suspension by introducing liquid suspension along the surface of the liquid suspension body at a predetermined rate and discharging the liquid suspension at substantially the same rate and entrained lighter solids at the liquid level,
    creating a heavier particle-entraining current by introducing liquid suspension at a second predetermined rate within said liquid suspension body below the liquid level of the body and discharging the liquid suspension at substantially said second rate and entrained heavier solids at a point below said liquid level,
    and maintaining the flows in the stated currents to retain a quiescent zone between the levels of the two currents.

References Cited

UNITED STATES PATENTS

| | | | |
|---|---|---|---|
| 2,721,658 | 10/1955 | Tromp | 209—172.5 |
| 2,775,346 | 12/1956 | Tromp | 209—172.5 |

FRANK W. LUTTER, *Primary Examiner.*